(12) United States Patent
Niebedim et al.

(10) Patent No.: US 12,070,798 B2
(45) Date of Patent: Aug. 27, 2024

(54) ADDITIVE MANUFACTURING WITH IN-SITU MAGNETIC FIELD SOURCE

(71) Applicants: Iowa State University Research Foundation, Inc., Ames, IA (US); UT-Battelle, LLC, Oak Ridge, TN (US)

(72) Inventors: Cajetan Ikenna Niebedim, Ames, IA (US); Abhishek Sarkar, Ames, IA (US); Matthew J. Kramer, Ankeny, IA (US); Thomas Lograsso, Ames, IA (US); Mark Christopher Haase, Cedar Park, TX (US); Somashekara Adinarayanappa, Katnataka (IN); Mariappan Parans Paranthaman, Knoxville, TN (US)

(73) Assignees: Iowa State University Research Foundation, Inc., Ames, IA (US); UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/300,213

(22) Filed: Apr. 15, 2021

(65) Prior Publication Data

US 2021/0323070 A1    Oct. 21, 2021

Related U.S. Application Data

(60) Provisional application No. 63/204,738, filed on Oct. 21, 2020, provisional application No. 63/010,718, filed on Apr. 16, 2020.

(51) Int. Cl.
*B22F 12/53*    (2021.01)
*B22F 10/34*    (2021.01)
(Continued)

(52) U.S. Cl.
CPC .............. *B22F 10/34* (2021.01); *B22F 12/53* (2021.01); *B22F 2202/05* (2013.01);
(Continued)

(58) Field of Classification Search
CPC .................. B23K 15/086; B28B 1/001; B22F 2003/1057
See application file for complete search history.

(56) References Cited

U.S. PATENT DOCUMENTS

| 5,516,670 A | * | 5/1996 | Kuehnle | ............ C12N 15/8207 435/459 |
| 2018/0236724 A1 | | 8/2018 | Compton | |
| 2020/0207022 A1 | * | 7/2020 | Benedict | ............... B29C 64/336 |

FOREIGN PATENT DOCUMENTS

WO    2018/081527    5/2018

OTHER PUBLICATIONS

Vorozhtsov, A. "Preliminary electromagnetic design and cost estimate of C-shape dipole magnet required for DIRAC experiment." 2011. (Year: 2011).*

(Continued)

*Primary Examiner* — Nicholas A Wang

(57) ABSTRACT

Embodiments of the present invention provide an electromagnet alignment system for AM or 3D printing technology providing improved in-situ alignment of the magnetic particulate material as it is dispensed during deposition to form a 3D shape. In-situ alignment of the magnetic particulate material can be controlled to be unidirectional or multi-directional.

11 Claims, 9 Drawing Sheets

(51) Int. Cl.
　　　*B33Y 10/00*　　　(2015.01)
　　　*B33Y 30/00*　　　(2015.01)
　　　*B33Y 40/00*　　　(2020.01)
　　　*B33Y 70/00*　　　(2020.01)

(52) U.S. Cl.
　　　CPC ........... *B22F 2302/25* (2013.01); *B33Y 10/00* (2014.12); *B33Y 30/00* (2014.12); *B33Y 40/00* (2014.12); *B33Y 70/00* (2014.12)

(56) References Cited

OTHER PUBLICATIONS

Yoonho Kim et al, Printing ferromagnetic domains for unthethered fast-transforming soft materials, Nature, vol. 558, pp. 274-279, 2018.

Christopher Reyes et al, Three-Dimensional Printing of a Lithium Ion Battery with Fused Filament Fabrication, Applied Energy Materials, 1, pp. 5268-5279, 2018.

J.S. Sander et al, High-performance battery electrodes via magenetic templating, Nature Energy, vol. 1, pp. 1-7, Aug. 2018.

Vladimir Popov et al, Prospects of additive manufacturing of rare-earth and non-rare-earth permanent magnets, Proceida Manufacturing, 21, pp. 100-108, 2018.

C.V. Mikler et al, Laser Additive Manufacturing of Magnetic Materials, JOM, vol. 69, No. 3, pp. 533-543, 2017.

Joshua J. Martin et al, Designing bioinspired composite reinforcement architectures via 3D magnetic priniting, Nature Comminications, [6.8641] DOI: 10.1038, 2015.

C. Huber et al, 3D print of plymer bonded rare-earth magnets and 3D magnetic field scanning with an end-used 3D printer, Appl. Phys. Lett. 109, 162401, 2016.

J. Geng et al, Bulk Combinational Synthesis and High Throughput Characterization for Rapid Assessment of Magnetic Materials: Application of Laser Engineered Net Shaping (LENS) , JOM, vol. 68, No. 7, 2016.

Abhishek Sarkar et al, In-situ magnetic alignment model for additive manufacturing of anisotropic bonded ma·agnets, Additive Manufacturing, 46, 102096, 2021.

Abhishek Sarkar et al, Functionalizing magnet additive manufacturing with in-situ magnetic field source, Additive Manufacturing , 34, 101289, 2020.

Kinjal Gandha et al, The Role of Processing Parameters on the hybrid NdFeB—SmFeN nylon composite bonded magne d Bi/:MnBi Journal of Magnetism and Magnetic Materials, 467, 8-13, 2018.

* cited by examiner

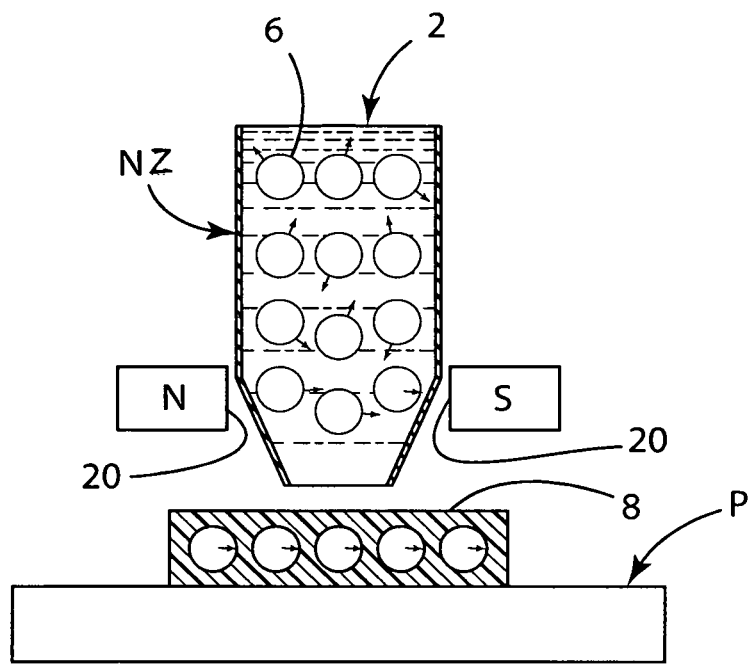
Fig. 1
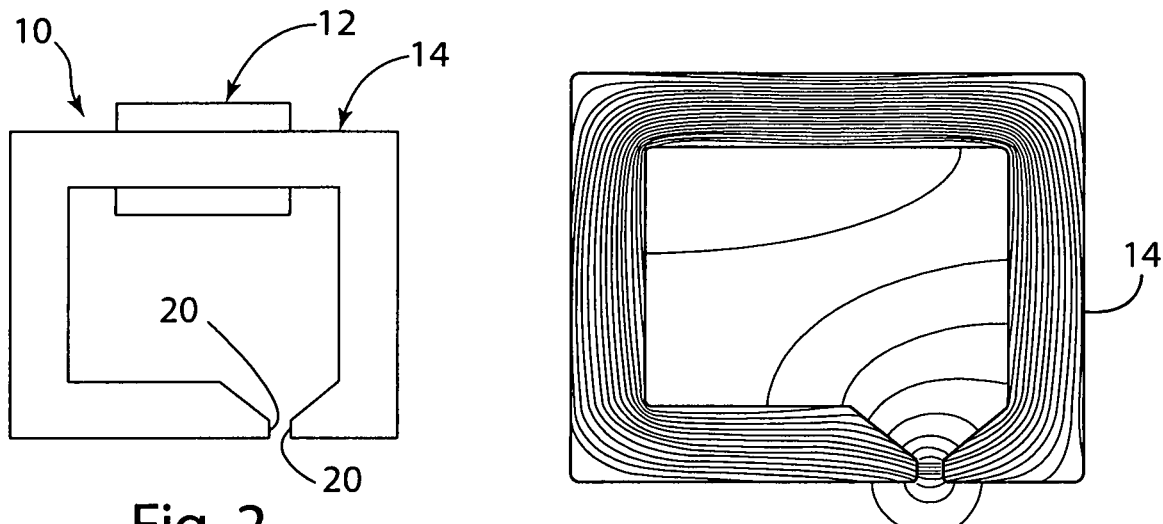
Fig. 2
Fig. 3

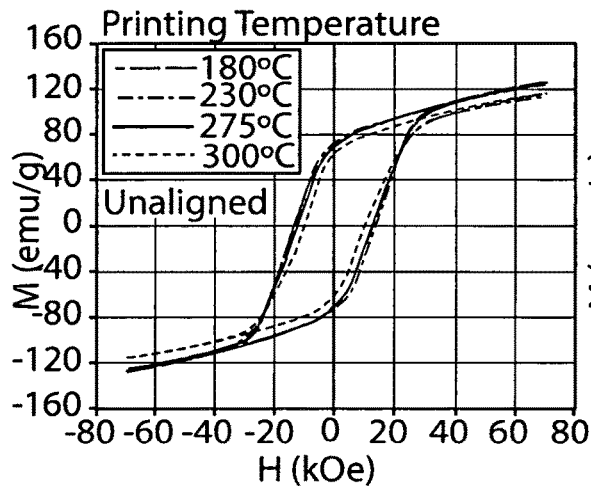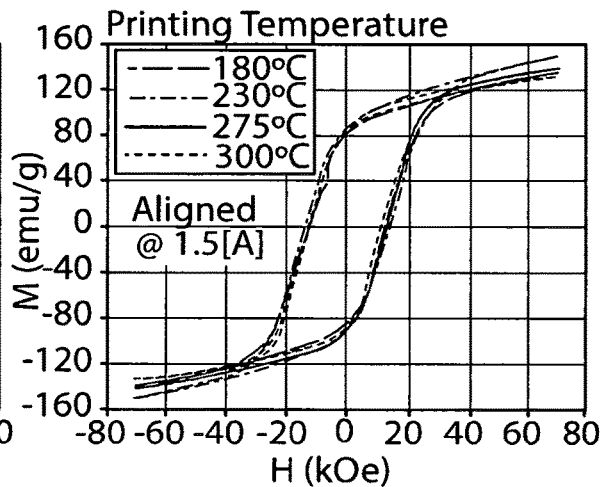
Fig. 6a    Fig. 6b
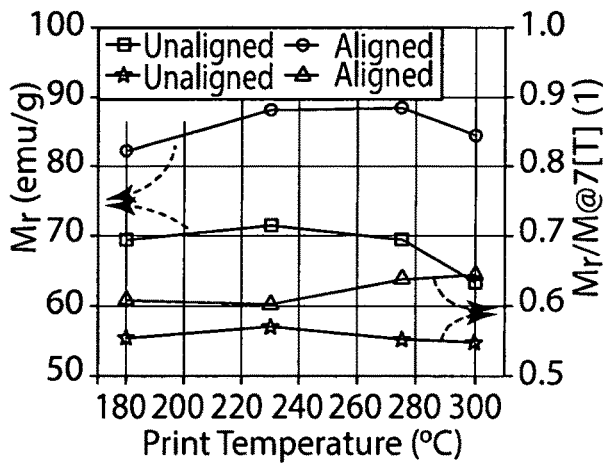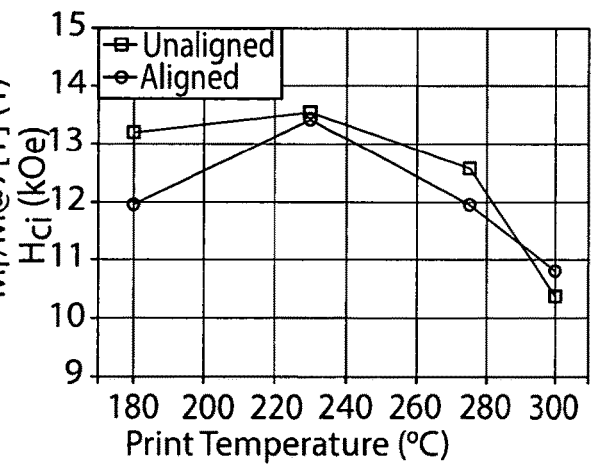
Fig. 6c    Fig. 6d

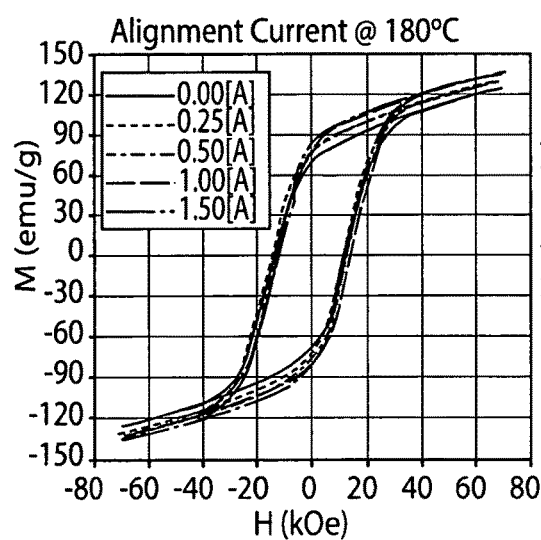
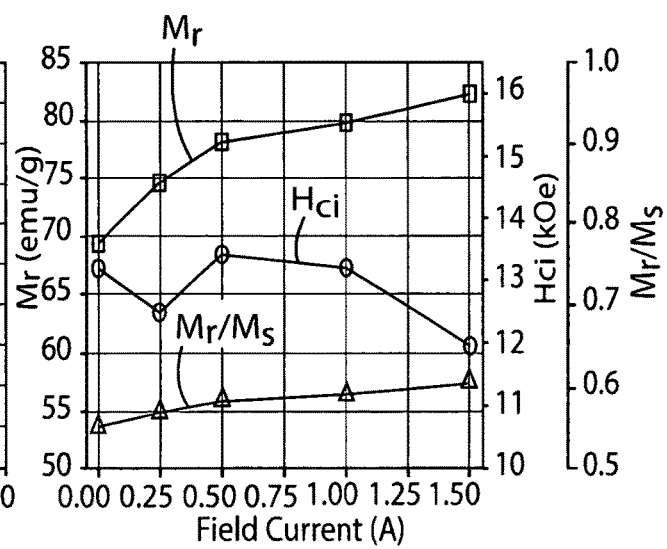
Fig. 7a
Fig. 7b

ADDITIVE MANUFACTURING WITH IN-SITU MAGNETIC FIELD SOURCE

RELATED APPLICATIONS

The application claims benefits and priority of provisional application Ser. No. 63/010,718 filed Apr. 16, 2020, and Ser. No. 63/204,738 filed Oct. 21, 2020, the entire disclosures of which are incorporated herein by reference.

CONTRACTUAL ORIGIN OF THE INVENTION

This invention was made with government support under Contract No. DE-AC02-07CH11358 and Contract No. DE-AC05-00OR22725 awarded by the Department of Energy. The United States government has certain rights in the invention.

FIELD OF THE INVENTION

The present invention relates to additive manufacturing or 3D printing that incorporates in-situ alignment of magnetic particulate material as the material is dispensed during production of 3D shapes and, more particularly, to an electromagnet alignment system for in-situ alignment of the magnetic particulate material as it is dispensed.

BACKGROUND OF THE INVENTION

Additive manufacturing (AM) (also known as 3D printing) is a trending technology for rapid-prototyping and fabrication of net-shaped components, such as for the manufacturing of permanent magnets and other magnetic materials. By avoiding the losses in subtractive manufacturing, AM processes can reduce materials waste and energy consumption. Also, AM processes have the benefits of minimizing or eliminating post-manufacturing machining and tooling typically required for conventional manufacturing.

Permanent magnets enable conversion of energy between mechanical and electrical. Although the energy density of bonded permanent magnets is normally less compared to sintered magnets, there are practical reasons for the applications of bonded permanent magnets. These applications are the reasons for which bonded permanent magnets are continuously occupying increased market share.

Binders for bonded permanent magnets are selected to be suitable above the maximum operating temperatures of the widely used Nd—Fe—B magnets; hence the binders do not limit high-temperature stability needed for application of Nd—Fe—B magnets. In addition, the use of binders in bonded permanent magnets can help overcome some of the limitations of sintered Nd—Fe—B magnets, including low corrosion resistance, poor mechanical stability and high thermal losses.

Bonded permanent magnets are conventionally manufactured either by compression molding with a thermosetting binders, or injection molding with a thermoplastic binder. The economic disadvantage of the dies used in conventional molding can be eliminated by applying 3D printing (AM) technologies to bonded magnets production. In the works by Li et al. [references 5, 6, 17], Big Area Additive Manufacturing (BAAM) system was found to produce magnets comparable or better in performance than standard injection molding process, while having the potential to eliminate the use of molds.

Ink-based 3D printing technology for fabrication of composite Nd—Fe—B/strontium ferrite ($SrFe_{12}O_{19}$) bonded magnets was demonstrated by Yang et al. [reference 19]. Yang et al. printed pseudo-plastic slurries of Nd—Fe—B with 20 wt. % of strontium ferrite and proposed the cost effectiveness of ink-based 3D printing technology.

In the work by Gandha et al. [reference 18], the BAAM process was used for 3D printing of 65 vol. % of Dy-free anisotropic Nd—Fe—B and Sm—Fe—N composite in Nylon 12. However, the 3D printed magnets were aligned after the printing process, resulting in an energy product of 11.3 MGOe.

Ferromagnetic particles in molten viscous polymer flowing through the nozzle of a 3D printer can be aligned in the direction of an applied magnetic field. Nlebedim et al. [reference 13] performed post-printing alignment of randomly oriented NdFeB magnets particles bonded in EVA polymer in order to understand the effects of temperatures (325-400 K) and magnetic fields (10-50 kOe) on alignment of the particles. The study, performed in a SQUID magnetometer, predicted possibility of higher degree of alignment at lower field strength for magnets aligned at higher temperatures (above the melting point of EVA). These results were further validated by Helena et al. [reference 20] suggesting that alignment field, $\mu_0 H < 1$ T, is sufficient to align 65 vol. % of Nd—Fe—B magnet particles (Dy-free anisotropic Magfine-MF18P) bonded in Nylon 12 to the applied field direction.

Process variables that are controlled for printing bonded permanent magnet shapes include magnet powder properties, processing temperature, loading factor, magnet density, and degree of alignment of the magnet powder particles and/or particle magnetic domains. Considering these process variable, there would be a significant advantage for a 3D printer-adaptable system exhibiting improved in-situ control of alignment of magnetic particulate material such as filamentary magnetic material as it is dispensed during additive manufacturing with control of processing temperature.

SUMMARY OF THE INVENTION

Embodiments of the present invention provide an electromagnet alignment system for AM or 3D printing to this end providing advantageous in-situ alignment (e.g. alignment of the magnetic easy axes) of the magnetic particulate material as it is dispensed for deposition to form a 3D shape. In-situ alignment of the magnetic particulate material during dispensing can be controlled to be unidirectional or multi-directional.

A particular embodiment of an electromagnet alignment system includes at least one electromagnet having an electromagnet coil disposed around a magnetic flux-conducting core and providing at least one pair of spaced apart electromagnet pole surfaces. The at least one electromagnet is mounted on a support structure for positioning the first and second pole surfaces in spaced and partially angular overlapping working relation to respective outer peripheral surfaces of the dispensing nozzle during dispensing of the magnetic particulate material through the dispensing nozzle. The system includes a power source for energizing the electromagnet coil to provide a continuous magnetic field in a selected direction between the pole surfaces during dispensing of the magnetic particulate material through the dispensing nozzle so that the magnetic field at least partially aligns the magnetic particulate material toward a selected direction. The output of the power source may be variable to vary the strength of the magnetic field between the opposing pole surfaces.

Other particular embodiments of the present invention envision providing multiple electromagnets about the dispensing nozzle controlled in a manner that the direction of the magnetic field between pole surfaces can be controllably varied as the magnetic particulate material is dispensed through the nozzle in order to deposit layers or bodies of magnetic particulate material having different magnetic particle orientations.

To this same end, still other particular embodiments of the present invention envision angular movement (e.g. incremental rotation) of one or more electromagnets relative to a longitudinal axis of the dispensing nozzle during dispensing of the magnetic particulate material to vary the orientation of the magnetic field relative to the dispensing nozzle.

Further particular embodiments of the system of the present invention include an electromagnet core configured and positioned to be non-axisymmetric relative to a central axis of a magnetic particulate material-receiving bed of an additive manufacturing device.

Still further particular embodiments of the system include an electromagnet support structure that is part of the deposition head of the AM device or 3D printing device.

Practice of embodiments of the present invention can reduce or eliminate the need for post-printing magnetic alignment of permanent magnet materials made via AM or 3D printing technology and thereby reduce or eliminate the costs associated with post-printing alignment. Other advantages and objects of the present invention will become more readily apparent from the following detailed description taken with the following drawings.

BRIEF DESCRIPTION OF THE DRAWINGS

FIG. 1 is a highly schematic illustration of an in-situ electromagnet alignment process pursuant to an embodiment of the invention for use in 3D printing of particulate magnetic materials onto a platform P of a 3D printing device.

FIG. 2 is a schematic of C-core electromagnet design of an illustrative embodiment of the invention for a 3D printer such as a commercial MakerGear M2 3D printer.

FIG. 3 shows magnetic field and flux contour plots for the C-core electromagnet.

FIGS. 6a and 6b show MH loops for 3D printed Nd—Fe—B+Sm—Fe—N/Nylon 12 (65 vol. % binder) where nozzle temperature was varied for alignment currents of 0 and 1.50 A, respectively. FIG. 6c shows magnetic properties including remanence ($M_r$) and the ratio of remanence-to-magnetization at 7T magnetic field ($M_r/M_{@7[T]}$) obtained using varying alignment current of 0 A (unaligned) and 1.50 A (aligned) at varying nozzle temperature. FIG. 6d shows coercivity obtained using varying alignment current of 0 A (unaligned) and 1.50 A (aligned) at varying nozzle temperature.

FIG. 7a shows magnetic MH loops of Nd—Fe—B+Sm—Fe—N in Nylon 12 (65 vol. % binder) sample printed at 180° C. nozzle temperature under varying alignment current, and FIG. 7b shows magnetic remanence ($M_r$), coercivity ($H_{ci}$) and remanence-to-saturation magnetization ratio ($M_r/M_s$) variation with field current for Nd—Fe—B+SmFe—N/Nylon 12 65 vol. % sample.

DETAILED DESCRIPTION OF THE INVENTION

Figure 4:
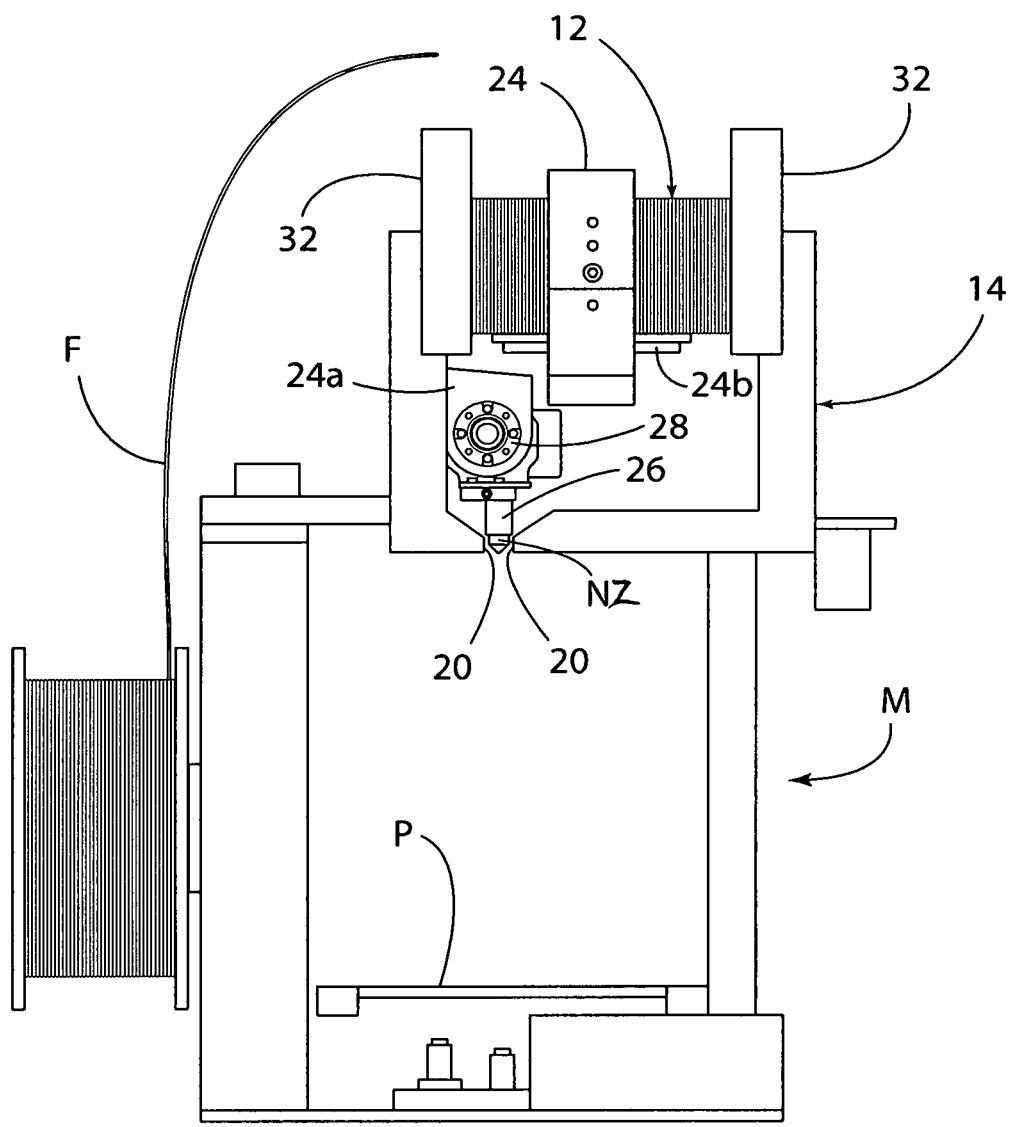
FIG. 4 shows an illustrative 3D printer having an in-situ electromagnet alignment system pursuant to a particular embodiment of the invention mounted on the deposition head of the 3D printer.

Illustrative embodiments of the present invention provide a 3D printing machine and process that are advantageous in that they embody an electromagnet alignment system that provides in-situ alignment of the magnetic particulate material as it is being dispensed to form a 3D shape or body, typically by layer-by-layer deposition. For purposes of illustration and not limitation, FIG. 1 shows a highly schematic representation of an illustrative embodiment of an in-situ electromagnet alignment for use in the 3D printing of particulate magnetic materials wherein first and second opposing magnetic pole surfaces 20 (N, S) reside partially about respective partial circumferential, peripheral surfaces of the dispensing nozzle NZ on opposite sides of the nozzle NZ during deposition of the magnetic particulate on the bed or platform P of a 3D printing machine. Practice of embodiments of the present invention can achieve in-situ controllable uni-directional or multi-directional alignment of the magnetic particulate material as it is dispensed through the dispensing nozzle onto the platform. The present invention is not limited to practice with 3D printing systems that employ an extruder but also can be practiced with other 3D printing or AM systems and processes that do not employ extruders.

With reference to FIG. 1, in practicing certain embodiments of the present invention, a solid precursor material 2 described in more detail below containing polymeric binder 4 and magnetic particulates (particles) 6 is supplied to a deposition head of a 3D printing system. Within the deposition head, the precursor solid material is melted and compounded before being extruded through and from a dispensing nozzle NZ. The extrudate 8, when exiting the dispensing nozzle, is at a temperature above the glass transition temperature ($T_g$) of the precursor material. In some embodiments, in order to avoid a temperature that could denature the magnetic particles, the precursor material is heated to a temperature of no more than 5, 10, 15 or 20 degrees C. above the glass transition temperature of the precursor material. Notably the glass transition temperature of the precursor material is to be distinguished from the glass transition temperature or melting point of the thermoplastic polymer. The extrudate 8 of the precursor material can exit the dispensing nozzle at a temperature that can be in the range of 120 to 300 degrees C. for purposes of illustration and not limitation.

In practice of embodiments of the present invention the melted feed material is extruded through the dispensing nozzle of the deposition head and deposited onto a platform P from which the printed 3D object will be removed, or the extrudate is deposited onto an existing portion of the object being manufactured to which the extrudate is being bonded. The extrudate is deposited layer-by-layer from the one or more deposition heads until an object is formed from the extrudate. As the extrudate exits the nozzle and is deposited, the extrudate cools, which results in solidification. In the case where a crosslinkable polymer is included in the extrudate, the deposition and cooling process leads to an increase in viscosity and a transition of the extrudate to a semi-solid or gel (i.e., a "solidified preform"). At this stage, an initial substantially incomplete level of crosslinking typically also occurs, before final hardening over time.

Pursuant to embodiments of the present invention, as the extrudate 8 passes through the dispensing nozzle on the way to being discharged and deposited, the extrudate is subjected to magnetic field resulting in in-situ alignment of the magnetic particulate material by an electromagnet alignment system to be described below with respect to an illustrative embodiment. The in-situ alignment of the magnetic particles refers to at least an alignment of the individual magnetic poles of the magnetic particles to the direction of the applied magnetic field. The alignment also involves a physical rotation of magnetic particles. In the case of a thermoplastic polymer containing aromatic groups, the polymer may also undergo alignment in the presence of a magnetic field by virtue of aligning and stacking of the aromatic groups. As the magnetic particles and/or thermoplastic polymer require an appreciable degree of freedom of movement to align themselves, the exposure to the directional magnetic field should occur at least during the time the precursor material is in a melted or partially melted form, i.e., before final solidification. Generally, in order for magnetic particles and/or thermoplastic polymer to sufficiently re-orient and align in the melt, the extrudate melt should possess a melt viscosity of up to or less than 20,000, 50,000, or 100,000 cPs, where cPs refers to a centipoise. However, in order to ensure that the extrudate maintains a shape when deposited, the melt on deposition should have a viscosity of at least 1,000, 2,000, 5,000, or 10,000 cPs. In order to sufficiently align the magnetic particles and/or thermoplastic polymer, the external magnetic field should generally have a magnetic field strength of at least 0.25 or 0.5 Tesla (0.25 T or 0.5 T). In different embodiments, the external magnetic field has a magnetic field strength of about, at least, above, up to, or less than, for example, 0.25, 0.5, 1, 1.2, 1.5, 2, 2.5, 3, 3.5, 4, 5, 6, 7 or 8 T.

Referring to FIG. 4, in a particular embodiment offered for purposes of illustration and not limitation to this end, the electromagnet alignment system for 3D printing includes a single electromagnet 10 mounted on a deposition head of a commercial 3D printer and comprising an electromagnet coil 12 disposed around a magnetic flux-conducting core 14 wherein the core 14 includes a pair of spaced apart, opposing first and second N/S pole surfaces 20 on respective opposing lowermost core segments. The pole surfaces are configured relative to the outer peripheral surface of the dispensing nozzle to promote a substantially uniform magnetic field laterally across the gap therebetween (laterally between pole surfaces 20). The coil 12 typically can comprise a copper wire coil wound about the core 14 as shown, while the core 14 typically is comprised of iron-based material such as cast, fabricated (e.g. cold rolled), iron or steel or other suitable magnetic flux-conducting material.

The electromagnet 10 is mounted on a support structure 24 that can be connected to the deposition head of a commercial 3D printing machine so that the pair of opposing pole surfaces 20 is positioned in spaced and partially angular overlapping working relation to an outer peripheral surface of a dispensing nozzle NZ of the 3D printing machine M. The electromagnet alignment system includes a power source 30 for energizing the electromagnet coil 12 to provide a continuous magnetic field in a selected direction between the opposing pole surfaces 20 during dispensing of the magnetic particulate material though the dispensing nozzle NZ so that the magnetic field at least partially aligns the magnetic particulate material toward a selected direction. The output of the power source may be constant or variable to vary the strength of the magnetic field between the opposing pole surfaces.

Figure 10:
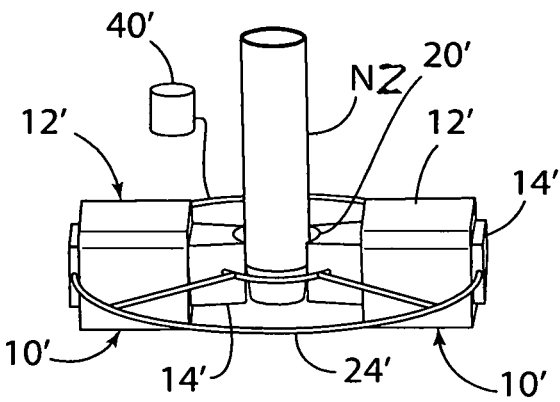
FIG. 10 schematically illustrates an embodiment of the present invention that includes two (2) opposing electromagnets, each having a flux-conducting core and wire coil on the core, mounted on a wire support frame that can be incrementally rotated by a motor.
Figure 11A:
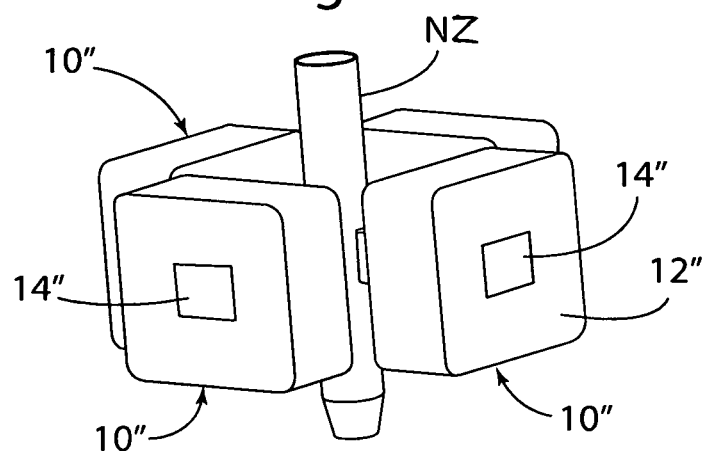
FIGS. 11a and 11b schematically illustrate an embodiment of the present invention that includes four (4) electromagnets, each having a flux-conducting core and wire coil, that can be mounted on a wire or other support frame.
Figure 11B:
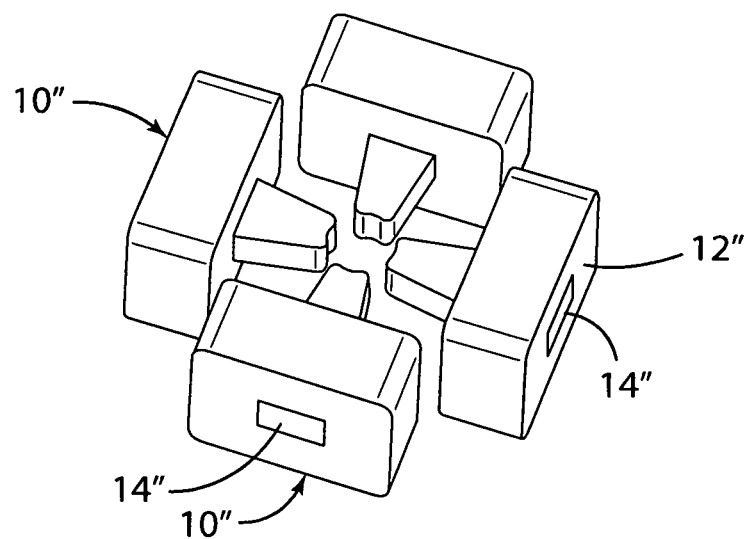

Although FIG. 4 illustrate an embodiment of the electromagnet alignment system that embodies a single electromagnet 10 with the features described in the preceding paragraph, other embodiments of the invention envision to include multiple separate electromagnets about the dispensing nozzle NZ. For example, two electromagnets 10', each having a coil 12' and core 14' that includes a pole surface, or four electromagnets 10'', each having a coil 12'' and core 14'' that includes a pole surface, disposed on a wire or other support frame 24', respectively, can be positioned about the dispensing nozzle NZ as illustrated in FIG. 10 and FIGS. 11a-11b, respectively. Thus, a single or a combination of multiple separate electromagnets, each having a coil/core can provide core pole surfaces. The electromagnets can be individually excited in a manner to generate the desired magnetic field between the core pole surfaces. In these embodiments, a single power source or multiple power sources can be provided for the electromagnets to this end. The direction and strength of the magnetic field between respective pairs of opposing pole surfaces or faces can be varied by providing and controlling a respective electrical power source to each electromagnet as the magnetic particulate material is dispensed through the nozzle in order to deposit layers or bodies of magnetic particulate material having different magnetic particle orientations wherein the deposited layers or bodies can be deposited side-by-side and/or one atop the other in practicing the invention to build different structures.

Other embodiments of the invention envision rotation of one or more electromagnets relative to the dispensing nozzle to vary the orientation of the magnetic field. For example, referring to FIG. 10, the wire or other support frame 24' supporting the electromagnets 10' can be rotated by a suitable motor 40', FIG. 10, such as a stepping motor, to move the electromagnets 10' in angular increments relative to the longitudinal axis of the dispensing nozzle NZ to vary the direction of the magnetic field during dispensing in order to deposit layers or bodies of magnetic particulate material having different magnetic particle orientations.

In practicing embodiments of the present invention, the solid precursor material comprising the magnetic particles 8 with polymeric binder 4, such as a thermoplastic or other polymer, is melted, compounded, and extruded in the deposition head of a 3D printing system. The thermoplastic polymer should also have the ability to harden after deposition and cooling. For purposes of the invention, the thermoplastic polymer preferably has a melting point of at least or above 175° C., 180° C., 185° C., 190° C., 195° C., 200° C., 225° C., 250° C., 275° C., or 300° C. Some examples of such thermoplastic polymers include polyamides (e.g., Nylon 6,6), polyphenylene sulfide, polyphenylene oxide, acrylonitrile butadiene styrene, polyether ether ketone, polyoxymethylene, polyether sulfone, polycarbonates (e.g., polylactic acid), polyetherimide, polyvinyl addition polymers (e.g., polyacrylonitrile, polyvinylchloride, polytetrafluoroethylene, and polystyrene), polyesters, and polybenzimidazole. In some embodiments, the thermoplastic polymer is a homopolymer, which may have any of the above compositions. In other embodiments, the thermoplastic polymer is a copolymer, which may be, for example, a block, alternating, random, or graft copolymer.

The thermoplastic polymer can be crosslinkable so as to behave as a pliable thermoplastic material at relatively low temperature during deposition of the precursor material, while being able to transform into a hardened durable non-pliable thermoset state after deposition and construction of the magnetic object. Thus, the polymeric binder can be considered a hybrid polymer, i.e., having characteristics of both a thermoplastic and a thermoset. However, at the thermoset stage, the polymeric binder forms a three-dimensional covalent network, and thus, cannot revert back to a thermoplastic state, as expected for a thermoset polymer. In some embodiments, the thermoplastic polymer is not crosslinkable. Exemplary hybrid polymers include, for example, polyurethanes, epoxy-containing polymers, and polymers containing vinyl acetate units.

Thermoplastic, hybrid, and other polymers that can be used in practice of embodiments of the present invention are described in detail in WO 2018/081527 A1 published May 3, 2018, the entire disclosure of which is incorporated herein by reference.

Practice of embodiments of the present invention also employ magnetic particles having a hard magnetic material composition (i.e., "magnetic particles") can have any suitable particle size, but typically no more than or less than 1 mm, 0.5 mm, 200 microns, 100 microns, 50 microns, 1 micron, 0.5 micron, 0.2 micron, or 0.1 micron, or a distribution of particles bounded by any two of these values. The magnetic particles can be, for example, nanoparticles (e.g., 1-500 nm) or microparticles (e.g., 1-500 microns). The term "hard magnetic material composition" refers to any of the ferromagnetic or ferrimagnetic compositions, that retains its magnetization even when the source of magnetic field is removed, known in the art as materials with high coercivity, generally at least or above 300, 400, or 500 Oe. Thus, the magnetic particles considered herein are not paramagnetic or superparamagnetic particles. The magnetic particles are magnetically anisotropic and may have any desired shape, e.g., substantially spherical, ovoid, filamentous, or platelike.

Typically, the permanent magnet composition is metallic or a metal oxide, and often contains at least one element selected from iron, cobalt, nickel, copper, gallium, and rare earth elements, wherein the rare earth elements are generally understood to be any of the fifteen lanthanide elements along with scandium and yttrium. In particular embodiments, the permanent magnet composition includes iron, such as magnetite, lodestone, or alnico. In other particular embodiments, the permanent magnet composition contains at least one rare earth element, particularly samarium, praseodymium, and/or neodymium. A particularly well-known samarium-based permanent magnet is the samarium-cobalt (Sm—Co alloy) type of magnet, e.g., $SmCo_5$ and $Sm_2Co_{17}$. A particularly well-known neodymium-based permanent magnet is the neodymium-iron-boron (Nd—Fe—B) type of magnet, typically having the formula $Nd_2Fe_{14}B$ which may also contain praseodymium and/or dysprosium. Other rare earth-containing hard magnetic material compositions include, for example, $Pr_2Co_{14}B$, $Pr_2Fe_{14}B$, and Sm—Fe—N. The hard magnet material may or may not have a composition that excludes a rare earth metal. Some examples of non-rare earth hard magnetic materials include MnBi, AlNiCo, and ferrite-type compositions, such as those having a Ba—Fe—O or Sr—Fe—O composition. Particle versions of such magnetic compositions are either commercially available or can be produced by well-known procedures, as evidenced by, for example, P. K. Deheri et al., "Sol-Gel Based Chemical Synthesis of $Nd_2Fe_{14}B$ Hard Magnetic Nanoparticles," Chem. Mater., 22 (24), pp. 65096517 (2010); L. Y. Zhu et al., "Microstructural Improvement of NdFeB Magnetic Powders by the Zn Vapor Sorption Treatment," Materials Transactions, vol. 43, no. 11, pp. 2673-2677 (2002); A. Kirkeminde et al., "Metal-Redox Synthesis of MnBi Hard Magnetic Nanoparticles," Chem. Mater., 27 (13), p. 4677-4681 (2015); and U.S. Pat. No. 4,664,723 ("Samarium-cobalt type magnet powder for resin magnet"). The permanent magnet composition may also be a rare-earth-free type of magnetic composition, such as a Hf—Co or Zr—Co alloy type of permanent magnet, such as described in Balamurugan et al., Journal of Physics: Condensed Matter, vol. 26, no. 6, 2014, the contents of which are herein incorporated by reference in their entirety. In some embodiments, any one or more of the above-described types of magnetic particles are excluded from the precursor material and resulting bonded permanent magnet produced after additive manufacturing.

The magnetic particles are generally included in the solid precursor material in an amount of at least or above 20 wt. % by weight of the polymer binder and magnetic particles (or alternatively, by weight of the solid precursor material). In different embodiments, the magnetic particles are included in an amount of at least or above 20, 30, 40, 50, 60, 70, 80, 90, 92, 95, or 98 wt. %, or in an amount within a range bounded by any two of the foregoing values. Alternatively, the magnetic particles are included in the solid precursor material in an amount of at least or above 40, 45, 50, 55, 60, 65, 70, 75, or 80 vol %.

In some embodiments, the solid precursor material may or may not further include non-magnetic particles having a composition that confers additional tensile strength to the bonded magnetic after curing. The non-magnetic particles can include, but are not limited to, carbon, metal, metal oxide, metal carbon particles, anti-oxidant compounds, and plasticizers. The particles may have any suitable morphology, including, for example, spheroidal or other particles or filaments.

Magnetic particles, non-magnetic particles and/or other additive components that can be used in practice of embodiments of the present invention are described in detail in WO 2018/081527 A1 published May 3, 2018, the entire disclosure of which is incorporated herein by reference.

In some embodiments, the extrudate after deposition on platform P is cooled over time, which leads to hardening and production of the hard magnetic bonded object. In the case where a cross-linkable polymer is included in the extruded, after the extrudate is deposited, and generally but not necessarily after a complete object of desired shape is constructed with the solidified preform, the solidified preform is cured by subjecting the solidified preform to conditions that result in substantial crosslinking to the extent that the thermoplastic behavior of the solidified preform transitions to thermoset behavior. At the curing stage, the transition to a thermoset generally coincides with an increase in viscosity of the solidified preform to a value substantially above 100,000 cPs, and typically, a value of at least or above 200,000, 500,000, or 1,000,000 cPs, and eventually, a transition to a completely non-flowable solid that may be characterized by the usual properties of a solid, e.g., tensile strength and elasticity.

The printed 3D shape that is ultimately built can be suited to any application in which a magnetic material having a significant degree of mechanical strength is desired. Although the shape of the magnetic material ultimately produced can be simple, e.g., a planar object, such as a film or coating of a desired two dimensional shape (e.g., square or disc), the additive manufacturing process is primarily suited to the production of complex (i.e., intricate) shapes. Some examples of intricate shapes include permanent magnets, rings, filled or unfilled tubes, filled or unfilled polygonal shapes having at least or more than four vertices, gears, and irregular (asymmetric) shapes. The printed shape may also be, for example, a functional motor component, engine component, or turbine component.

In some embodiments, the bonded permanent magnet is coated with a polymer that functions to reduce exposure of the bonded permanent magnet to oxygen. The coating polymer can be, for example, an epoxy-based or silica-based polymer or hybrid thereof. In some embodiments, the coating polymer is a sol gel type of polymer, which may be a hybrid organic-inorganic polymer.

The Examples are set forth below for the purpose of illustration and to describe certain specific embodiments of the invention. However, the scope of this invention is not to be in any way limited by the examples set forth herein.

EXAMPLES

Figure 5A:
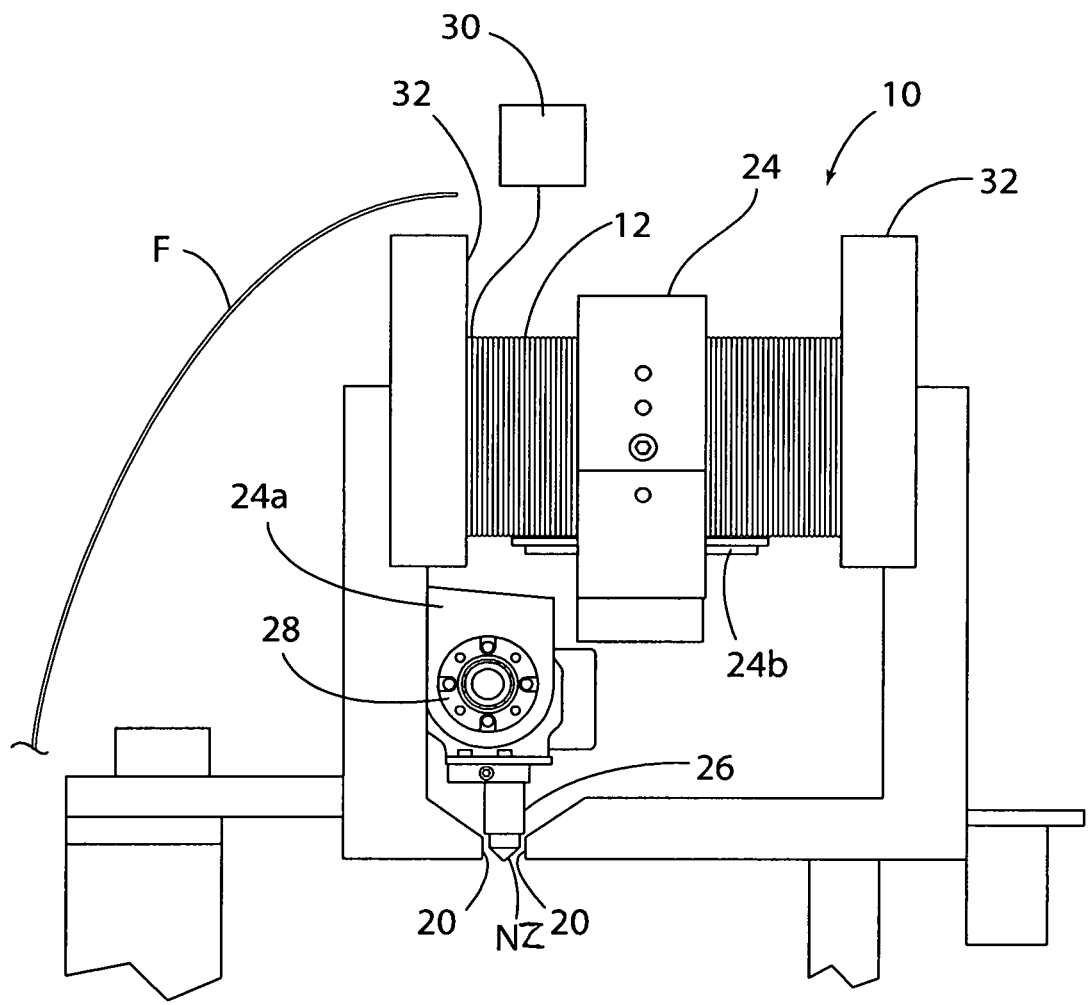
FIGS. 5a, 5b, and 5c are enlarged views of FIG. 4 showing the in-situ electromagnet alignment system using a C-shaped electromagnet mounted on the deposition head of the 3D printer.
Figure 5B:
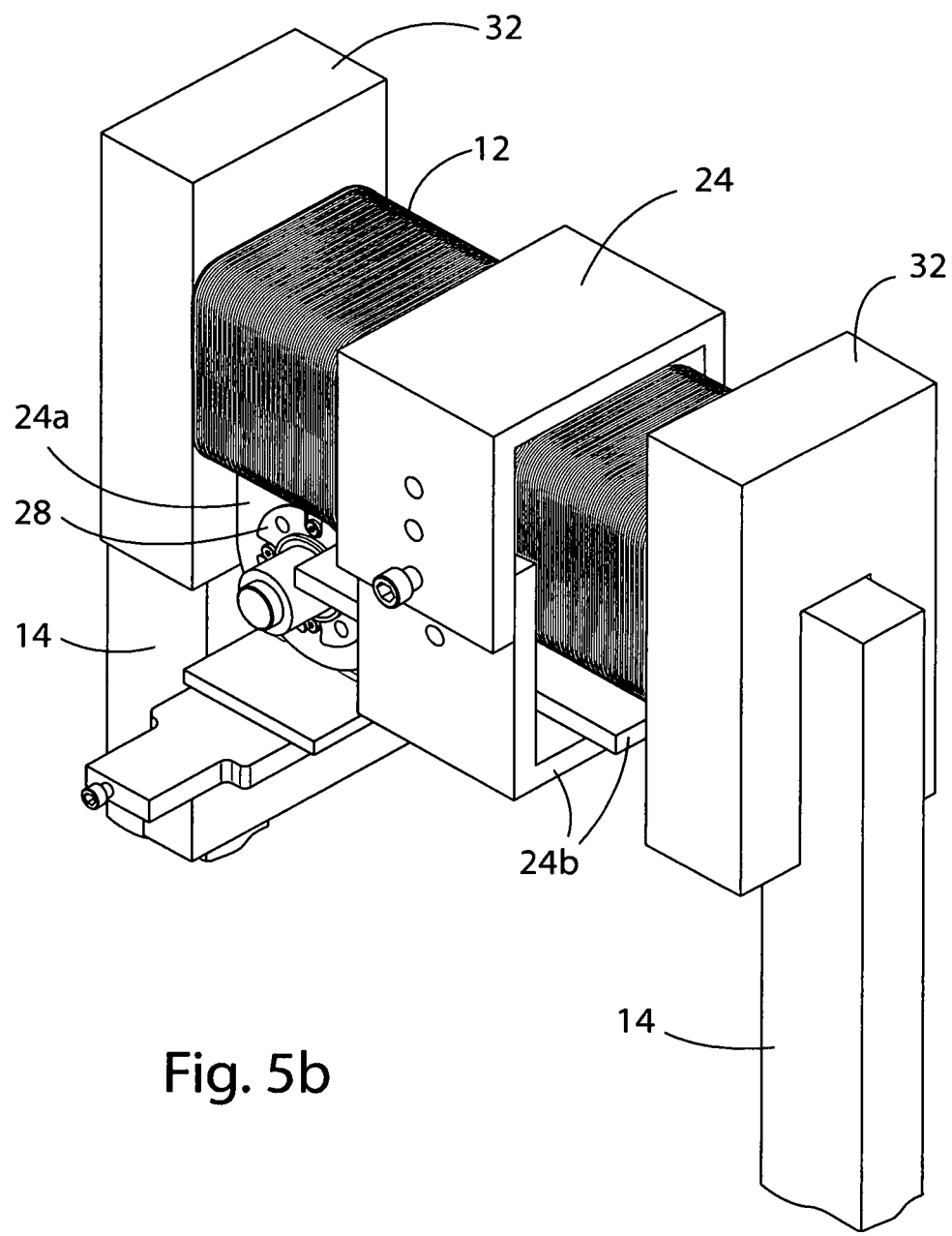
Figure 5C:
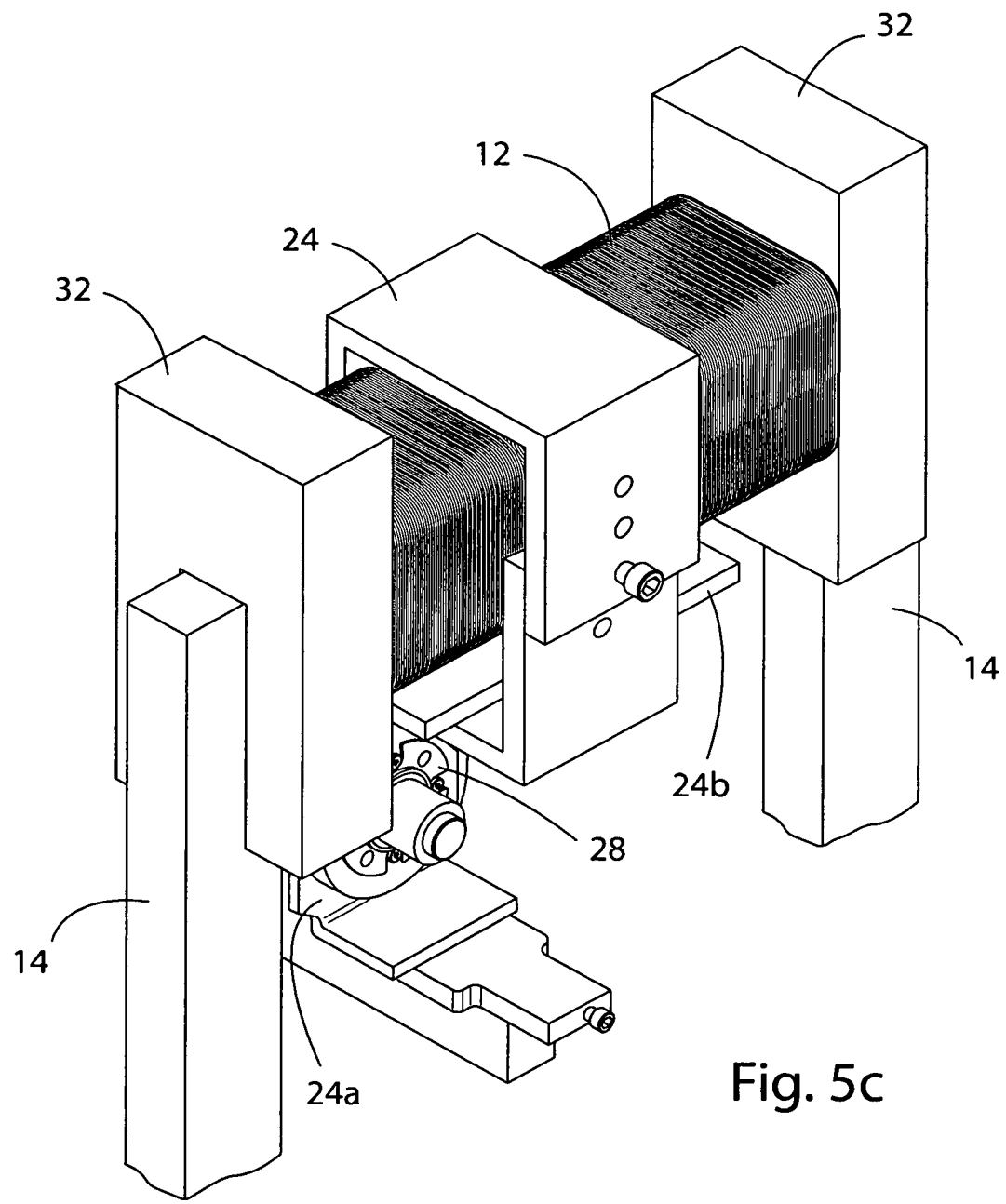

The following Examples illustrate practice of embodiments of the present invention using an embodiment of the electromagnet alignment system for 3D printing that includes a single electromagnet 10 having a wound copper electromagnet coil 12 disposed around a magnetic flux-conducting cold-rolled steel core 14 wherein the core 14 includes a pair of spaced apart, first and second opposing pole surfaces 20 on respective opposing lowermost core segments, see FIGS. 4, 5a, and 5b.

This illustrative embodiment employs a non-axisymmetric C-core magnetization architecture that was generated by a CAD model in Solidworks software and fabricated for use with a MakerGear M2 3D commercial printer. The schematic of the design is presented in FIGS. 2 and 3. The C-core was designed to be non-axisymmetric to maximize the area covered by the dispensing nozzle NZ over the printer bed or platform P. The estimated mass of the electromagnet unit was 4.5 kg.

The electromagnet core 10 and coil 12 are positioned and supported by a multi-piece support bracket 24 so that the pole surfaces 20 of the electromagnet are positioned on opposite sides of the peripheral surface of the bronze (non-magnetic) dispensing nozzle NZ below a nozzle extruder heater 26 of the MakerGear M2 3D printer as shown best in FIG. 5a. The pole surfaces are spaced a distance 5 mm from the nozzle outer peripheral surface, typically in the range of 4 to 6 mm from the nozzle outer peripheral surface.

The support bracket 24 includes several pieces that are bolted or welded together and includes a clamp mechanism 24a that is used to fixedly clamp the bracket onto the extruder motor 28 of the commercial of the MakerGear M2 3D printer, while the coil 12 is wound on the uppermost, horizontal core segment, FIGS. 2 and 5a. The extruder motor thereby supports the bracket 24 and the electromagnet 10. Inverted U-shaped end guard components 32 are fastened by screws onto the upstanding, core side segments and function to confine the wire coil 12 in position during and after winding. The coil 12 is supported on a platform 24b of the support bracket 24.

The coil 12 was connected to a DC power supply 30 (shown schematically) and designed to sustain a maximum amperage of 4 A.

The parameters in Table 1 below were used for prototyping the C-core electromagnet. The coils were wound on the AISI1010 steel uppermost core segment. The electromagnet assembly was mounted on the deposition head of the 3D printer. FIG. 4 shows the electromagnet assembly installed on the commercial MakerGear M2 3D printer. The movement of the mounted electromagnet towards the ends of 3D printer's nozzle-bench assembly was restricted to eliminate the possibility of it crashing onto the end supports.

TABLE I

Design parameters for the C-core electromagnet.

| Parameters | Values |
|---|---|
| Core material | AISI 1010 Steel |
| Winding material | AWG22 Copper |
| Winding length, L [mm] | 150 |
| Winding thickness, w [mm] | 50 |
| Coils per unit length, [# mm$^{-1}$] | 1.55 |
| Number of turns, N [#] | 2500 |
| Assembly weight, [kg] | 4.70 |

FIG. 3 shows the magnetic field/flux plot obtained by finite element analysis (FEA) for the electromagnet when only 1 A of current was applied to the copper coils. The FEA calculations predicted average magnetic field ($\mu_0 H$) to be 1.8 kOe.

The electromagnet core was excited with a Kepco model KLN 150-10 DC power supply. The magnetic field strength generated with the electromagnet was measured for different excitation currents using a FW Bell 5080 gaussmeter. The applied direct current was varied from 0.50 A to 2.00 A with steps of 0.25 A.

The field profiles across the width of the airgap were plotted and demonstrated that an average field generated for 1 A of applied current was 1.54 kOe. For all the applied electric currents, a uniform magnetic field was achieved across the 4 mm nozzle diameter, indicating the potential for uniform alignment of magnetic particles during 3D printing. The magnetic field uniformity over the nozzle increased across the nozzle as the magnetic field strength was reduced. Moreover, a uniform magnetic field was achieved across the 4 mm central nozzle region including the nozzle taper region (about 3 mm) and nozzle hole diameter (about 1 mm), indicating the potential for uniform alignment of magnetic particles during 3D printing. The distance between the electromagnet poles over which uniform magnetic field strength was obtained increased with reducing current.

Filament preparation and 3D printing with in-situ alignment: Commercially available filaments were generally made of polylactic acid (PLA) and acrylonitrile butadiene styrene (ABS). However, it is possible to create composite filaments of polymer matrix with desired material as the dispersed phase. In the Examples, two different filament materials were used. The first magnetic particulate material used was 65 vol. % hybrid magnet powder containing a mixture of Nd—Fe—B and Sm—Fe—N pelletized in Nylon 12. The pellets were obtained from NICHIA Corporation. The second magnetic particulate material was samarium cobalt (Sm—Co) anisotropic magnet particles in PLA, made using recycled industrially generated Sm—Co swarfs and PLA pellets, as follows.

PLA pellets (46.35 gm) were dissolved in dichloromethane (DCM) (100 mL) while being mechanically homogenized at 150 rpm to obtain a viscous solution using Waverly OS20S overhead stirrer. 15 vol. % of the recycled Sm—Co grinding swarfs (53.65 g) were added to the dissolved PLA/DCM solution. The mixture was stirred while the DCM was evaporated in a fume hood at room temperature. Afterwards, the dried Sm—Co/PLA was broken down into pellet-sized pieces of arbitrary shape (averaging <5 mm in size). The as-received Nd—Fe—B+Sm—Fe—N/Nylon 12 pellets were extruded in Filabot 2.0 extruder at 180° C. to form 1.75 mm filaments. The Sm—Co/PLA pellets were also extruded at 180° C. to form 1.75 mm filaments. FIG. 4 shows a reel having the filament for feeding to the extruder of the 3D MakerGear M2 printer 3D in commercial applications.

The filament F was fed to the extruder of the MakerGear M2 3D printer for compounding, melting, and deposition on the printer bed, while producing magnetic field alignment with the mounted electromagnet 10. To determine the onset of softening and melting temperature of the polymer matrix, differential scanning calorimetry (DSC) was performed, with two thermal cycles between 40° C. and 240° C. The Nylon 12 binder material for the hybrid Nd—Fe—B+Sm—Fe—N/Nylon 12 softens around 160° C. and starts to melt at 180° C. The DSC results were used as a benchmark to determine the lowest printing temperature for the sample.

A CAD model of the bonded magnet to be printed was imported into Simplify3D software of the 3D printer, and the dispensing nozzle NZ was set to desired temperature. For each magnet composition, a small square shaped bonded magnet of 10 mm×5 mm×5 mm was printed. For the Nd—Fe—B/Sm—Fe—N/Nylon 12 filaments, printing was performed at different printing temperatures, 180, 230, 275 and 300 degrees C., and at a fixed alignment current of 1.50 A (corresponding to magnetic field of 1.8 kOe). Printing was also performed at a fixed temperature of 180° C. and varying alignment currents of 0.0, 0.25, 0.50, 1.00 and 1.50 A. The bed temperature and inlet load of the filament fixed at 70° C. and 1.5 kg, respectively. Since, the loading fraction for the Nd—Fe—B+Sm—Fe—N/Nylon 12 was high (65 vol. %), it was difficult to extrude the filament through the 3D printer nozzle. For the Sm—Co/PLA composite, the nozzle was maintained at 215° C. and the bed at 70° C. Due to the lower loading (15 vol. %) of the recycled Sm—Co, compared to the hybrid Nd—Fe—B+SmFe—N(65 vol. %), an inlet load of 0.5 kg was maintained on the filament. Alignment for 3D printing of the Sm—Co/PLA composite was performed at a fixed field corresponding to applied current of 1 A.

Magnetic Characterization and Discussion:

The 3D printed bonded magnet samples of both the hybrid Nd—Fe—B+Sm—Fe—N/Nylon 12 and recycled Sm—Co/PLA were characterized in Quantum Design MPMS system. All samples were measured for their magnetic properties at 27° C. with the measurement field varying from −7 to 7 T. The effects of nozzle temperatures on the magnetic properties of the printed nylon bonded Nd—Fe—B+Sm—Fe—N magnets are shown in FIGS. 6a-6d. FIG. 6a shows the magnetic hysteresis plots for samples printed without the application of magnetic field. It shows that printing at temperatures between 180-275° C. did not degrade the magnetic properties. However, lower coercivity and magnetization were observed at 300° C. Although the 3D printing was performed in air, it unlikely that the reduced coercivity and magnetization are related to compositional changes in either the Nd—Fe—B or the Sm—Fe—N phases of the magnet powders. Oxidation of Nd—Fe—B and/or Sm—Fe—N or the decomposition of Sm—Fe—N should result in the formation of a-Fe which, in turn, should lead to an increase in magnetization, rather than a decrease. These changes in magnet performance at 300° C. may be related to the effect of redistribution of magnet powders. At elevated temperature, the viscosity of the Nylon 12 becomes very small which reduces the dispersion of the particles in the binder. Such redistribution promotes particle-to-particle interactions which has been shown to affect magnetic performance of bonded magnets.

When viscoelastic drag is lowered at elevated temperatures and magnetic field is simultaneously applied, alignment of magnetic easy axes to the applied field direction should result in increase in magnetization. This is readily seen by comparing magnetization values at similar field strengths (e.g. 70 kOe) in FIG. 6b with FIG. 6a. FIG. 6c shows that the degree of alignment increased with printing temperature. The degree of alignment was defined as the value of the ratio of remanence (Mr) to magnetization at the maximum applied magnetic field of 70 kOe. Near the Curie temperature ($T_c$) of Nd—Fe—B (about 310° C.), the randomizing effect of thermal energy should surpass the alignment effects of the applied magnetic field. Hence, printing at 300° C. would result in less efficient alignment of the magnetic easy axes of the powders to the field direction, compared with printing at temperatures well below the Curie temperature. Nevertheless, the printing temperature should also be sufficiently high to reduce the viscosity of the binder and allow the particles to rotate. Consistent with decreased magnetization at 300° C., $M_r$ also decreased at the same printing temperature, as also shown in FIG. 6c. The coercivity trend in FIG. 6d suggests that below 220° C., coercivity mechanism is dominated by the nucleation demagnetization process (i.e. Stoner-Wolfhart mechanism): coercivity increases with alignment field. Above 220° C., domain wall displacement demagnetization process (i.e. Kondorski mechanism) dominated: coercivity decreases with increasing degree of alignment.

FIGS. 7a, 7b show the effect of varying applied magnetic field (by varying applied electric current) on the degree of alignment, remanence and coercivity, at printing temperature of 180° C. The hysteresis loops in FIG. 7a shows that magnetization consistently increased with applied magnetic field, during 3D printing due to increasing decree of alignment (FIG. 7b). The increase in degree of alignment should also result in increased Mr, as shown in FIG. 7b. It is unclear why the coercivity initially decreased between the sample printed without magnetic field and the sample printed at magnetic field strength corresponding to applied current of 0.25 A. However, FIG. 7b suggests that the competition between the two demagnetization processes described above is both temperature and field dependent.

Figure 8:
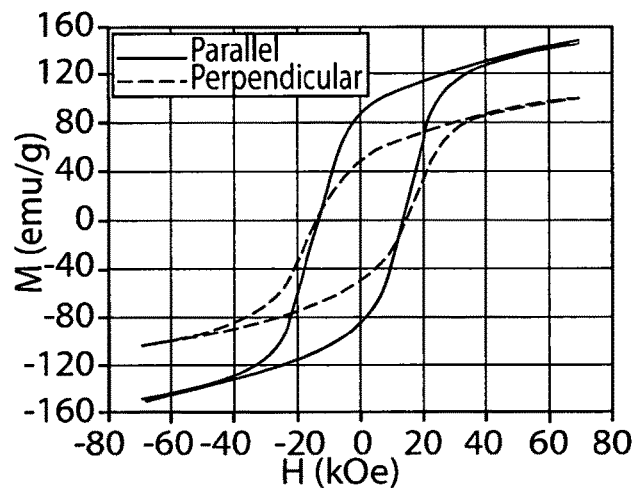
FIG. 8 compares MH loops measured parallel and perpendicular to the alignment directions for Nd—Fe—B+Sm—Fe—N in Nylon 12 (65 vol. % binder) sample aligned at 230° C. nozzle temperature and 1.50 A alignment current.

FIG. 8 shows magnetization vs. magnetic field measured both parallel (∥) and perpendicular (⊥) to the direction of magnetic alignment for a select sample printed at 230° C. and at magnetic field strength corresponding to 1.5 A of applied current. The reduced magnetization in the perpendicular direction, compared to the parallel direction, further confirms the orientation of the magnetic easy axes to the applied field direction during 3D printing.

Figure 9A:
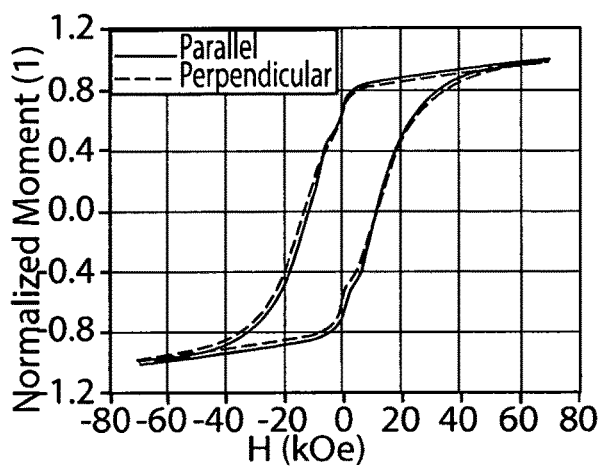
FIGS. 9a and 9b show normalized MH loop for unaligned and aligned Sm—Co in PLA (15 vol. % binder) 3D printed sample, respectively, at 1.00 A alignment current.
Figure 9B:
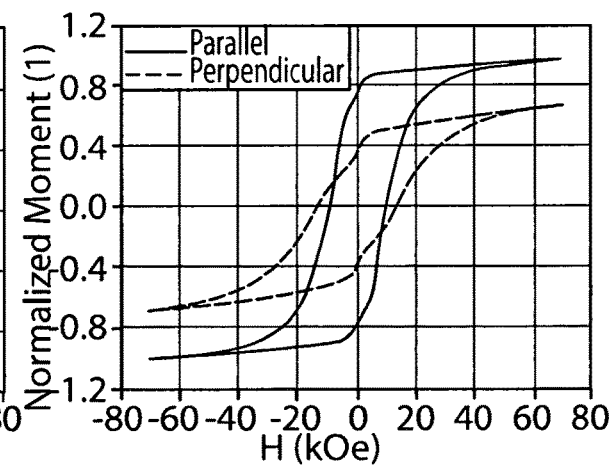

The Examples demonstrate the potential for extending 3D printing in magnetic field to the recycling of industrially generated magnet swarfs was demonstrated using 15 vol. % of Sm—Co bonded in PLA. Swarfs are magnet fillings (particles) generated during post-production operations such as grinding, polishing, etc. FIG. 9a shows the magnetization vs. applied field plot for a sample printed as described in the experimental section. As expected, FIG. 9b shows isotropic magnetization vs. magnetic field for sample printed without magnetic field. Printing in magnetic field resulted in magnetic anisotropy in the magnet, hence the differences in magnetization for measurements in the parallel and perpendicular directions. The coercivity values are 12.2 kOe for the isotropic sample, 9.3 kOe and 13.2 kOe for the anisotropic sample measured in the parallel and perpendicular directions, respectively.

Moreover, the Examples demonstrate the in-situ magnetic alignment for 3D printed magnets with a non-axisymmetric C-core electromagnet, modeled using FEM, prototyped and integrated into a commercial 3D printer. 65 vol. % of Nd—Fe—B+Sm—Fe—N in Nylon12 was printed in magnetic field and at different nozzle temperatures and applied field strengths. 15 vol. % of Sm—Co in PLA was also printed in magnetic field in order to demonstrate the extensibility of the system to recycling of waste permanent magnet materials. For both material types, the effect of applied field in orienting the particles of the anisotropic magnet powders to the magnetic field direction was demonstrated. The degree of alignment of the magnet powders to the field direction was found to be a function of both the applied magnetic field and printing temperature.

Under applied field of 0.15 kOe, Sm—Co and hybrid Nd—Fe—B/Sm—Fe—N printed samples showed degrees-of-alignment of 83% and 65%, respectively. The Examples verify that integration of magnetic field sources into 3D printing processes will result in magnetic alignment of particles while ensuring that other advantages of 3D printing are retained.

Embodiments of the present invention can be incorporated in the well-known BAAM process, which employs an unbounded open-air build space in which at least one, typically a multiplicity, of deposition heads controlled by one or a multiplicity of multi-axis robotic arms operate in concert to construct an object. In the BAAM process, the feed material is processed within and ultimately deposited from the deposition head layer-by-layer as an extrudate, which cools over time to produce the bonded permanent magnet. The BAAM process considered herein may use only the hard magnetic precursor material as feed for the entire BAAM process, or the BAAM process may employ the hard magnetic precursor material as feed in one or more deposition heads and may employ another (nonmagnetic) feed in one or more other deposition heads to construct an object with magnetic and non-magnetic portions. As well known, the deposition head in a BAAM process is designed to combine melting, compounding, and extruding functions to produce and deposit an extrudate of the precursor material layer-by-layer. The deposition heads are moved and precisely positioned by the multi-axis robotic arm, which can be either stationary or mounted on a multi-axis or conventional three-axis gantry system. The multi-axis robotic arms are, in turn, instructed by a computer program, as generally provided by a computer-aided manufacturing (CAM) software package. As also well known, in the BAAM process, one deposition head may be partly or solely responsible for building a specific region of the overall object, but generally coordinates with at least one other deposition head, which is involved in building another region of the overall object. The BAAM process is described in detail in, for example, C. Holshouser et al., Advanced Materials & Processes, 15-17, March 2013, and M. R. Talgani et al., SAMPE Journal, 51(4), 27-36, July/August 2015, the contents of which are herein incorporated by reference in their entirety. Embodiments of the present invention can be incorporated in other 3D printing processes as well.

Using process inputs that include, but are not limited to, the compositions of the magnetic particles and polymeric binder, the input load and flow of the solid precursor feed material, the dimensions of dispensing nozzle, the magnetic field strength and orientation whether constant or varying, among others, a software code can be developed to predict the in-situ alignment of the magnetic particles achievable by practice of embodiments of the present invention described above.

Further although the Examples demonstrate in-situ alignment of 3D printed magnets to prototype net-shaped magnets with complex alignment requirements, practice of embodiments are also be applicable for net-shaping of soft magnet-based and bio-inspired composites [described in references 21,22]. Soft magnetic materials in polymer matrix could-be shaped using the alignment field of the electromagnet and upon solidification, the material would be conformed in the desired shape. Magnetic templating would be another area in which in-situ alignment technique could be applicable for 3D printing. The magnetic templating of lithium electrodes could be combined with 3D printing of electrodes to allow in-situ pore alignment while 3D printing of electrodes [references 23,24]. Therefore, the mechanism could be applied for in-situ channeling of 3D printed structures.

Although certain embodiments have been described in detail above for purposes of illustration, the present invention is not limited to these embodiments, and changes and modifications can be made to these embodiments within the scope of the invention as set forth in the following claims.

References which are incorporated herein by reference:
[1] S. W. Pattinson, M. E. Huber, S. Kim, J. Lee, S. Grunsfeld, R. Roberts, G. Dreifus, C. Meier, L. Liu, N. Hogan, A. J. Hart, Adv. Funct. Mater. 2019, 29, 1970222.
[2] J. J. Senior, M. E. Cooke, L. M. Grover, A. M. Smith, Adv. Funct. Mater. 2019, 29, 1904845.
[3] Y. Pang, Y. Cao, Y. Chu, M. Liu, K. Snyder, D. MacKenzie, C. Cao, Adv. Funct. Mater. 2019, 1906244.
[4] C. Huber, C. Abert, F. Bruckner, M. Groenefeld, O. Muthsam, S. Schuschnigg, C. Vogler, R. Windl, D. Suess, App!. Phys. Lett. 2016, 109, 162401.
[5] L. Li, A. Tirado, B. S. Conner, M. Chi, A. M. Elliott, O. Rios, H. Zhou, M. P. Paranthaman, J. Magn. Magn. Mater. 2017, 438, 163.
[6] L. Li, A. Tirado, I. C. Nlebedim, O. Rios, B. Post, V. Kunc, R. R. Lowden, E. Lara-Curzio, R. Fredette, J. Ormerod, T. A. Lograsso, M. P. Paranthaman, Sci. Rep. 2016, 6, 36212.
[7] J. Geng, I. C. Nlebedim, M. F. Besser, E. Simsek, R. T. Ott, JOM2016.
[8] C. V. Mikler, V. Chaudhary, T. Borkar, V. Soni, D. Jaeger, X. Chen, R. Contieri, R. V. Ramanujan, R. Banerjee, JOM 2017, 69, 532.
[9] W. Xia, Y. He, H. Huang, H. Wang, X. Shi, T. Zhang, J. Liu, P. Stamenov, L. Chen, J. M. D. Coey, C. Jiang, Adv. Funct. Mater. 2019, 29, 1900690.
[10] S. K. M. M. P. Paranthaman, I. C. Nlebedim, F. Johnson, Mater. Matters 2016,]], Ill.
[11] BCC Research, Magnets and Magnet Materials: Global Markets; Bangalore, 2017.
[12] R. Sueptitz, S. Sawatzki, M. Moore, M. Uhlemann, O. Gutfleisch, A. Gebert, Mater. Corros. 2015, 66, 152.
[13] I. C. Nlebedim, H. Ucar, C. B. Hatter, R. W. McCallum, S. K. McCall, M. J. Kramer, M. P. Paranthaman, J. Magn. Magn. Mater. 2017, 422, 168.
[14] O. Gutfleisch, K. Girth, T. G. Woodcock, L. Schultz, Adv. Energy Mater. 2013, 3, 151.

[15] J. Ormerod, S. Constantinides, J. Appl. Phys. 1997, 81, 4816.

[16] L. Li, B. Post, V. Kunc, A. M. Elliott, M. P. Paranthaman, Scr. Mater. 2017, 135, 100.

[17] L. Li, K. Jones, B. Sales, J. L. Pries, I. C. Nlebedim, K. Jin, H. Bei, B. K. Post, M. S. Kesler, O. Rios, V. Kunc, R. Fredette, J. Ormerod, A. Williams, T. A. Lograsso, M. P. Paranthaman, Addit. Manuf 2018, 21.

[18] K. Gandha, L. Li, I. C. Nlebedim, B. K. Post, V. Kunc, B. C. Sales, J. Bell, M. P. Paranthaman, J Magn. Magn. Mater. 2018.

[19] F. Yang, X. Zhang, Z. Guo, S. Ye, Y. Sui, A. A. Volinsky, J. Alloys Compd. 2019, 779, 900.

[20] H. A. Khazdozian, L. Li, M. P. Paranthaman, S. K. McCall, M. J. Kramer, I. C. Nlebedim, JOM 2019.

[21] J. J. Martin, B. E. Fiore, R. M. Erb, Nat. Commun. 2015.

[22] Y. Kim, H. Yuk, R. Zhao, S. A. Chester, X. Zhao, Nature 2018, 558, 274.

[23] J. S. Sander, R. M. Erb, L. Li, A. Gurijala, Y. M. Chiang, Nat. Energy 2016.

[24] C. Reyes, R. Somogyi, S. Niu, M. A. Cruz, F. Yang, M. J. Catenacci, C. P. Rhodes, B. J. Wiley, ACSAppl. Energy Mater. 2018.

We claim:

1. An electromagnet alignment system for in-situ alignment of magnetic particulate material passing through a tubular dispensing nozzle body of a deposition head of a 3D deposition device for deposition to form a 3D shape, comprising:
    at least one electromagnet having an electromagnet coil disposed around a magnetic flux-conducting core having a core configuration to provide at least one pair of spaced apart first and second opposing magnetic pole surfaces of the core, said coil comprising a winding having a size that is larger than space surrounding a frustoconical discharge end of the dispensing nozzle body,
    an electromagnet support structure comprising a platform that is mounted on the deposition head separate from and above the dispensing nozzle body and on which the electromagnet coil is supported above the space surrounding the frustoconical discharge end of the dispensing nozzle so as to position the at least one pair of first and second magnetic pole surfaces of the core in the space adjacent to respective peripheral surfaces of the frustoconical discharge end of the dispensing nozzle body to establish, when the coil is energized, a magnetic field extending between the at least one pair of first and second magnetic pole surfaces in a transverse direction to a longitudinal axis of the frustoconical discharge end of the dispensing nozzle body during dispensing of the magnetic particulate material through the frustoconical discharge end of the dispensing nozzle body, and
    a power source that energizes the electromagnet coil to provide the magnetic field in said transverse direction between the magnetic pole surfaces of the core during dispensing of the magnetic particulate material through the dispensing nozzle body so that the magnetic field at least partially aligns the magnetic particulate material toward said transverse direction to the longitudinal axis of the frustoconical discharge end of the dispensing nozzle body.

2. The system of claim 1 that includes multiple electromagnets.

3. The system of claim 2 wherein the multiple electromagnets are controlled in a manner to vary the magnetic orientation of the magnetic particulate material from one layer or body to another as it is deposited.

4. The system of claim 2 wherein the multiple electromagnets include first and second electromagnets having a respective first and second electromagnet coil disposed around a respective first and second magnetic flux-conducting core that provides a respective first and second magnetic pole surfaces of the core.

5. The system of claim 1 wherein the at least one electromagnet is angularly movable relative to the longitudinal axis of the tubular dispensing nozzle body to vary the magnetic orientation of the magnetic particulate material from one layer or body to another as it is deposited.

6. The system of claim 1 wherein the platform of the electromagnet support structure is mounted on an extruder motor on the deposition head of an additive manufacturing device or 3D printing device.

7. The system of claim 1 wherein the first and second magnetic pole surfaces of the core are in opposing relation in a manner to promote a substantially uniform magnetic field therebetween.

8. The system of claim 1 wherein the core of the at least one electromagnet includes core pole segments that terminate in the pole surfaces and wherein the core segments are non-axisymmetric relative to a central axis of a magnetic particulate material-receiving platform of the additive manufacturing device.

9. The system of claim 1 wherein the output of the power source is variable to vary the strength of the magnetic field between the pole surfaces of the core.

10. The system of claim 1 wherein the winding of the electromagnet coil of the at least one electromagnet is disposed on an upper horizontal core segment above and outside the space surrounding the frustoconical discharge end of the dispensing nozzle body and the pole surfaces of the core.

11. The system of claim 10 wherein the upper horizontal core segment is disposed remote from the pole surfaces that reside on lower core vertical descending segments.

* * * * *

UNITED STATES PATENT AND TRADEMARK OFFICE
CERTIFICATE OF CORRECTION

| | | |
|---|---|---|
| PATENT NO. | : 12,070,798 B2 | |
| APPLICATION NO. | : 17/300213 | |
| DATED | : August 27, 2024 | |
| INVENTOR(S) | : Cajetan Ikenna Nlebedim et al. | |

Page 1 of 1

It is certified that error appears in the above-identified patent and that said Letters Patent is hereby corrected as shown below:

On the Title Page

Item (12), delete "Niebedim" and insert --Nlebedim--

At item (72), Line 1, first named inventor should be:
Cajetan Ikenna Nlebedim, Ames, IA Signed and Sealed this
Nineteenth Day of November, 2024

Katherine Kelly Vidal
*Director of the United States Patent and Trademark Office*